FIP8102 XR 3,660,760

United States Patent

Schaad et al.

[15] 3,660,760

[45] May 2, 1972

[54] INDUCTIVE COMMUNICATION SYSTEM

[72] Inventors: Howard A. Schaad, Abingdon, Ill.; Richard L. Randolph, San Rafael, Calif.

[73] Assignee: William J. Foley, Galesburg, Ill. a part interest

[22] Filed: July 23, 1969

[21] Appl. No.: 844,047

[52] U.S. Cl. ....................................325/28, 179/82, 325/180, 325/318, 343/719

[51] Int. Cl. ....................................................H04b 13/02

[58] Field of Search....................325/28, 180, 318, 319, 370; 340/4, 4 E, 15, 15.5; 324/1, 5, 6, 7, 8, 9; 179/82, 1 UW; 343/709, 719; 385/382, 385, 377

[56] References Cited

UNITED STATES PATENTS

| | | | |
|---|---|---|---|
| 2,628,275 | 2/1953 | Parker | 325/308 X |
| 2,653,220 | 9/1953 | Bays | 325/28 |
| 3,549,818 | 12/1970 | Turner | 179/82 |
| 782,181 | 2/1905 | Squier | 325/26 X |
| 979,144 | 12/1910 | Fessenden | 325/28 |
| 2,499,195 | 2/1950 | McNiven | 325/28 |
| 2,585,907 | 2/1952 | Barret | 325/28 |
| 2,938,999 | 5/1960 | Etter | 325/180 X |
| 2,998,516 | 8/1961 | Lehan et al. | 325/28 |
| 3,065,408 | 11/1962 | Marsh | 324/6 |
| 3,078,348 | 2/1963 | McIntosh | 179/82 |
| 3,273,110 | 9/1966 | Monroe et al. | 325/28 X |
| 3,284,713 | 11/1966 | Bailey | 325/319 |
| 3,495,209 | 2/1970 | Engle | 340/4 |

*Primary Examiner*—Benedict V. Safourek
*Attorney*—Beveridge & De Grandi

[57] ABSTRACT

There is disclosed a communication system in which a pair of spaced conductor rods or elements, embedded or placed in the earth, and energized by a signal voltage to induce a dynamic magnetic signaling field above the earth surface between the conductor element and having a specific and relatively large controlled area of high signal resolution. A match of the earth's impedance to the signal source is achieved by adding additional conductors at the remote conductor point. In locations where it may not be practical to embed the elements in a vertical position, horizontally buried elements may be used and the conductor nearest the signal voltage source may be constituted by an earth-embedded utility pipe. Switching devices controlled by coded signals may be used to connect or disconnect such conductors to thereby vary the system impedance or control the strength of the magnetic induction signaling field, as well as vary the area and shape of the magnetic induction signaling field. The magnetic induction signaling field may be picked up by magnetic pick-up coil or other devices sensitive to magnetic fields.

22 Claims, 6 Drawing Figures

INVENTORS
HOWARD A. SCHAAD
RICHARD L. RANDOLPH

BY Beveridge & De Grandi
ATTORNEYS

INVENTORS
HOWARD A. SCHAAD
RICHARD L. RANDOLPH

BY Beveridge & DeGrandi
ATTORNEYS

INDUCTIVE COMMUNICATION SYSTEM

BACKGROUND OF THE INVENTION

This invention relates to communication systems and more particularly to a new and novel method and apparatus for transmitting information within a well defined area by establishing therein a sustained dynamic induction signal field.

Inductive loop communication systems have been successfully employed in many situations where limited area coverage was desired. In this type of system a receiver is used which is activated by a fluctuating magnetic field induced from a signal-carrying current flow through a conducting wire loop. However, because the flux of the induced magnetic field falls off rapidly as distance is increased from the conducting wire, the space which can be effectively covered within the loop is severely limited, while outside the loop a useful signal extends only a short distance. Efforts have been made to communicate by conductive currents in moist earth and water as exemplified by Monroe et al. U.S. Pat. No. 3,273,110, McNiven U.S. Pat. No. 2,499,195, Sato U.S. Pat. No. 3,268,854, and Curry U.S. Pat. No. 3,265,972. In such prior art systems detection normally requires that probes be immersed or embedded in the energized medium and in any case such systems do not utilize a broad magnetic induction field as disclosed herein.

The present invention encompasses a method and apparatus for creating in a large mass of earth a sustained signal-carrying dynamic electrostatic field with an associated induced dynamic magnetic field. The magnetic signal induction field extends above the surface where its signal is detected by small portable receivers such as a coil, amplifier, and a utilization device such as a speaker or earphone to produce sound.

The dynamic electric and resulting induced magnetic signaling fields are created by applying a signaling voltage between two or more spaced preferably vertical, conductor elements which extend into or are immersed or embedded in the earth. A single wire is used to connect the most remote conductor element to the signal source. Because of the characteristics of the earth as a dielectric media, a large dynamic electrostatic field is created which may be considered as comprised of an infinite number of lines of electrostatic force. Charged particles (predominantly electrons because of the lower mobility of ions) flow along the curved lines of this field and each line contributes its own induced magnetic field following the natural laws of electromagnetic phenomena. By varying the voltage, signals may be transmitted through the electric and magnetic fields. These are picked up by a receiver and reproduced in their original form which may be a pulse signal, tone, voice message, music, or other unmodulated or modulated signals.

The shape of the equipotential lines of the dynamic electrostatic field between two embedded conductor elements generally approximates the shape of a magnetic field around an elongated bar magnet. Charged particles are induced to flow along the curved lines of this pattern. Given adequate input power, as the distance between the conductor elements is extended, the width of the field broadens (though not linearly) so that a substantial increase in effective signal area is achieved. The magnetic induction signal resulting from widely spaced earth embedded conductor elements can be detected at distances far removed from and extending well beyond the embedded conductor elements and the conductor wire to the remote conductor element. By varying the number and positioning of conductor elements, and by using more or less input power, the area activated can be readily controlled both as to extent and shape. Another advantage of the method and apparatus of this invention is that the dynamic magnetic field extending above the surface permeates areas (such as the interior of buildings and structures) which are not effectively penetrated by radio waves and in fact, the presence of trees appear to augment the strength of the induced magnetic field.

Accordingly, it is the object of this invention to provide a novel method and apparatus for communicating effectively through the media of earth and water by means of a sustained dynamic electric field, and to extend the communication by means of an induced dynamic magnetic field thence to either fixed or mobile stations on or above the earth's surface.

Another object of this invention is to provide a novel method and apparatus to enable the communication of information in a manner by which it is confined to specified limited areas on or near the earth's surface.

Another object of this invention is to provide a novel method and apparatus to enable the effective communication of information throughout areas which, by virtue of their size, configuration or composition, are not sufficiently served by present communications systems.

Another object of this invention is to provide a novel method and apparatus to enable effective inductive communication throughout specified limited areas on or near the earth's surface without the use of connecting conductors.

In carrying out the invention in an open field, for example, a pair of spaced conductor rods or elements are embedded in the earth and such rods are energized by a voltage signal to induce a dynamic magnetic field above the earth surface, said field having a specific and relatively large controlled area of high resolution. In one preferred embodiment, a remote conductor element is embedded in the earth and, preferably, in a substantially vertical position relative to the earth. A near conductor element may likewise be embedded in the earth with the signal source, such as an audio power amplifier having a pair of output terminals with one of the output terminals being connected to the remote or far embedded conductor element by a low-resistance insulated wire conductor, which may or may not be buried. The near conductor element or rod is connected to the second of the output terminals. Matching of the earth impedance to the signal source is preferably carried out by the use of one or more additional conductor elements embedded adjacent to the remote conductor element and preferably at 90° angle to a line between the remote conductor and the near conductors. However, in locations where it may not be practical to embed the elements in vertical position in the earth, horizontal buried elements may be used, and the near conductor element may be constituted by an earth embedded metal utility pipe, particularly one which is known not to extend appreciably toward or in the direction of the far or remote conductor as this may shorten the detectable dynamic magnetic signal induction field.

Switching devices, controlled by coded signals on the insulated wire connecting the remote conductor with the signal source, may be used to connect or disconnect the additional conductors to thereby vary the total system impedance and control the strength of the magnetic induction signal field. As field strength is thusly varied, the area of the magnetic induction signal field is likewise varied.

Laterally spaced further remote conductor elements may be embedded in the earth and connected by higher resistance wires (due regard being had for the relative spacing of remote ground conductors to the near ground conductor) to the wire between the remote conductor element and the signal source to establish magnetic induction fields of almost any desired configuration and pattern, and, as in the case of the size variation embodiment, may be connected in or out of the pattern by switches operated manually or by code signals on the signaling wire. It has been found that the magnetic induction signal field broadens, (but not linearly) in width as the distance between the near and far conductor elements is increased (assuming, of course, adequate input power). Accordingly, the remote conductor elements may be switched into the pattern and the closer (relatively) conductor element switched out or disconnected to lengthen and broaden the magnetic field as desired.

DESCRIPTION OF THE DRAWINGS

The above and other objects, features and advantages of the invention will best be understood from the following description taken in conjunction with the accompanying drawings in which.

Figure 1:
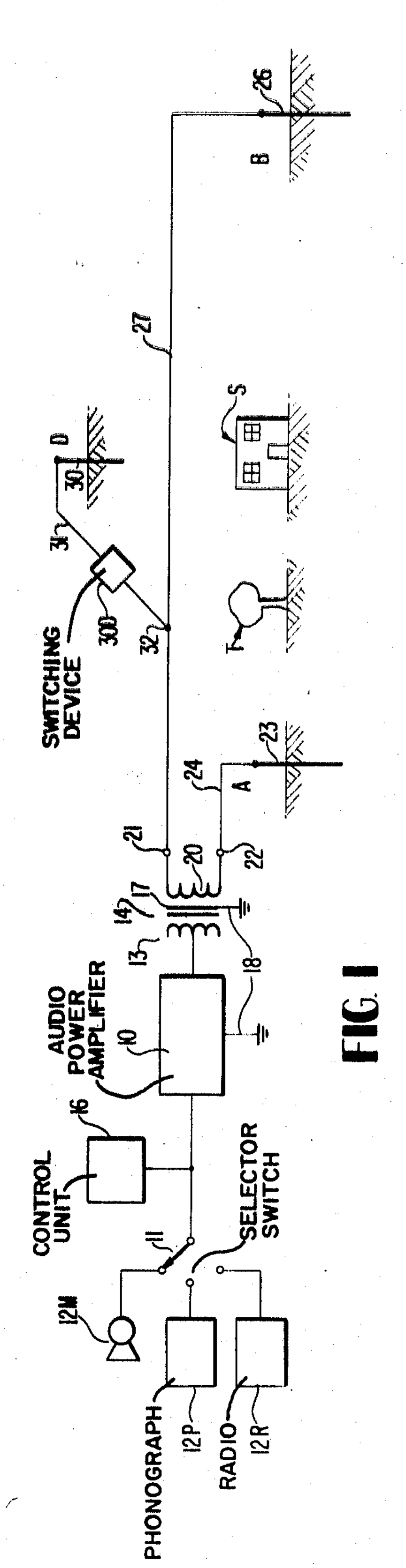
FIG. 1 is an explanatory block diagram incorporating the invention in which spaced points or locations on the earth are illustrated in fragmentary partial cross-sections, it being understood that the same are connected by a common earth mass, the dielectric media being excited, FIGS. 2–5 inclusive illustrate various embodiments and applications of the invention and are included to illustrate various aspects of the invention not shown in FIG. 1.

As set out generally above, the invention is concerned with the establishment and utilization of a sustained dynamic magnetic induction signal field above the earth's surface and within a broad but essentially limited geometrical pattern or known area on and above the surface of the earth. In general, the invention accomplishes this purpose by establishing a dynamic electrostatic field in the earth between two conductor elements embedded in the earth and connected to an electrical signal voltage source. This achieves a broad dynamic electrostatic field of energy which induces a well defined magnetic field pattern in and above the earth to constitute a magnetic induction signal field. In this manner, the problem of establishing a useable signal pattern over substantial but known areas is largely overcome. The magnetic field flux lines, being essentially infinite in number and generated by a wide dynamic electrostatic field offers to the detection and amplification devices a high resolution of signal patterns over a wide area. It has been found that the earth is very inductive as is evidenced by a specific phase shift and as further evidenced by the broad inductive field pattern above the surface of the earth. The dielectric properties of the earth, in union with this inductive, and also pure resistive characteristics seem to combine to enable a large mass of earth media to support, when subjected to a fluctuating voltage potential, an excellent and well defined pattern of sustained dynamic magnetic field. By the use of conductive elements or rods properly spaced in the soil of the earth and by proper application and use of the connecting leads, as described herein, the earth will become charged with a potential when even a small direct current voltage is applied. Evidence to this fact can be witnessed by the simple procedure of measuring the direct current resistance of the dielectric (earth). When a direct current resistance measurement is taken, the earth takes on a charge as does any dielectric. The charge can be dissipated when in the process of making direct current resistance measurements. The direct current resistance of the earth will, of course, vary and nothing new has been discovered regarding direct current earth resistance or measurement. It has been observed, however, that when two spaced conductor elements, being round rods of sufficient length to couple electrically with the ground (normally 2 to 6 feet is sufficient), are placed vertically in the soil and an electrical signal potential or voltage is applied between them, the earth acts as a giant capacitor with the rods charging the earth as the dielectric. An electrostatic signal field is established in the dielectric of the earth with flux lines or equipotential flux lines of electrostatic force extending in a broad symmetrical pattern between and extending far beyond the vertical conductive elements.

Because of the characteristics present in the earth, charges flow essentially along the direction of the lines of electrostatic force and when the conductive elements are energized by an alternating current signal, the flow of free electrons throughout the area encompassed in the electrostatic field is caused to respond to the changing potential of the alternating current input signal thus establishing the broad pattern of dynamic electric field. Since each line electron flow has associated with it an induced magnetic field, a broad magnetic field is likewise established which fluctuates in response to the input alternating current signal voltage and these magnetic lines of force not only permeate the ground but extend above the surface as well. In areas where earth conductivity between conductor elements may be greater, the breadth or range of the magnetic induction signal field is reduced. For example, in a test system, rain weakened the strength of the magnetic induction signal field at least at the periphery thereof.

It is well known that the capacitive reactance of a capacitor decreases as the size of the capacitor increases. In the present situation, because of the tremendous size of the earth acting as the dielectric, the capacitive reactance is very small; but the inductance of the earth, on the other hand, is very large and most of the energy of the system is found in the pulsing of free electrons and the associated dynamic magnetic field.

When it is desired to alter the size and/or shape of the energized area, this can be accomplished by adjusting the power of the input signal and/or by using additional vertical conductor elements in an array and such manner as to produce a specific pattern.

The vertical conductor elements placed in the earth need not be large in diameter or great in length. The rods should preferably be of a non-corrosive material. For permanent installations, copper or copper clad material is not used because after a period of time, copper may become copper oxide or have a copper oxide coating thereon when placed in some soils and thus become a rectifier and have the usual effect of clipping the alternating current signal. Stainless steel rods, ⅜ inch in diameter, and driven 2 to 6 feet in the earth have proven to be very effective.

When dealing with a pattern of electron flow in the earth, and depending on this phenomena to produce an effectively homogenous pattern of a magnetic field, there is some concern for nulls or low signal areas. Such areas considered to be low in signal strength may be energized by use of additional earth embedded conductor elements. By use of a wire of suitable impedance per foot of length relative to that of the main transmission wire, and of sufficient length to reach the far side of the low signal strength area and properly terminated at an additional vertical conductor element placed in the ground and electrically connected to the master transmission line, an additional magnetic induction signal pattern will be set up between the second vertical conductor element and the ground of the signal voltage source. In the event the second conductor rod is placed between a strongly active field and in or beyond the weak area, the weak area will become activated with magnetic inductive energy.

The proper use of the technique of energizing a large dielectric such as the earth in the manner described above will produce an inductive signal field even though the frequency transmitted is low and would normally fall below the frequency usually considered for useful inductive signal strengths radiated from a dielectric. Areas as large as 200 acres have been energized with relatively low power output devices and rather simple detection devices. Buildings large or small within the area of inductive radiation carry the inductive patterns throughout the building. Foilage, trees and plant life do not adversely affect the transmission of the signal and in fact, stronger signals have been detected in the areas of trees and other objects which have a portion embedded in the earth and which protrude above the earth's surface.

While the above description has been related to audio frequencies, this invention is not limited to audio frequencies but is applicable to higher frequencies as well, the upper frequency ranges being limited by the reactance of the earth. Even though the signals which are most commonly used will be voice and music, the system can be made to accommodate other types of signals (such as pulsed FM, etc.) both modulated or unmodulated.

Referring now to FIG. 1, there is disclosed a signal voltage source 10 which, in the embodiment disclosed is a conventional audio power amplifier which may have push-pull output stages connected through the primary windings 13 of transformer 14, the center tap of primary 13 being connected to the B+ of the power supply. The core 17 of transformer 14 may be connected to alternating current electrical ground by way of the normally provided third or ground conductor to the power supply, indicated generally by the numeral 18. A selector switch 11 may be used to connect a primary signal source to the input of amplifier 10, as for example microphone 12M, or phonograph 12P or radio 12R or any other signal source may be used. In an embodiment disclosed in FIG. 3, such primary signal source may be constituted by an inductive pickup coil.

The upper and lower ends of transformer secondary 20 constitute the output terminals 21 and 22 of amplifier 10. Terminal 22 may be wired directly to ground connections 18. In any case, there appears at the output terminals of the audio amplifier 10 a signal voltage which is to be communicated to within a prescribed geometrical pattern or area on the surface of the earth. Thus, output terminal 22 is connected to a near conductive element 23 vertically driven into the ground at point "A" for a distance of between about 2 to 6 feet, 3 feet usually being sufficient. The conductor 24 connecting output terminal 22 to to vertical earth exciting conductor element 23 is a low resistance wire as for example No. 10 copper wire. A first remote conductor element 26 at remote point B is connected to output terminal 21 by a low resistance insulated conductor wire 27 so that the output signal voltage appearing at output terminals 21 and 22 is applied to vertical earth exciting conductive elements 23 and 26 to thereby establish an electrostatic force field between conductor elements 23 and 26, respectively. This electrostatic field has equipotential lines of electrostatic force extending in a broad symmetrical pattern between the conductor elements and existing well beyond the vertical conductive elements. Free charges, primarily electrons, in the earth flow essentially along the direction of the lines of electrostatic force and induce a magnetic induction signal field which fluctuates in response to the alternating current signal voltage and in a geometrical pattern which is generally an elongated substantially elliptical shape, with typical length and breadth parameters of such fields being given in the examples set forth below. Moreover, such magnetic signal field is relatively uniform at least within a broad area of the geometrical pattern to thereby provide a wide area of resolution or detectable signal strength. Both conductor elements 23 and 26 are driven to essentially the same depth in the ground (namely about 3 feet) and are non-corrosive, a very useful conductor element being stainless steel rods of about 5/8 inch in diameter. The size and number of the elements being chosen so that conductive shunting of the capacitive characteristics of the earth (discussed above) between the elements 23 and 26 is kept to a minimum. The size of the area can be adjusted by varying the power input signal or by varying the spacing between conductor elements. For example, by moving conductor element 26 further away from vertical element 23, the length of the magnetic induction field is accordingly lengthened and, significantly, the width of the magnetic induction field is likewise increased (not linearly). In the embodiment shown in FIG. 2, this may be accomplished automatically through the switching circuitry to be described in detail hereinafter.

In order to change the geometrical shape of the induction signal field pattern in a direction laterally of the line between points A and B, a further laterally located vertical conductive element 30 may be driven in the ground at a suitable distance laterally of a line between points A and B, as for example, at point D. Vertical conductor element 30 is connected by a wire conductor 31 through a switching device 30-D (which may be eliminated) to wire 27 at point 32. Wire 31 should have an impedance, per foot of length, relative to the impedance of the main transmission wire 27 which is higher than the impedance of the insulated wire conductor between points A and B and if the impedance between 32 and D and 32 and B is equal then the impedance of the wire may be the same, assuming similar impedances at the vertical conductor elements. Switching element 30-D is controlled by coded signals carried on wire 27. In the disclosed embodiment such coded signals are selectively transmitted from control unit 16 in the form of a coded sequence of pulses of a selected frequency, spacing etc. Switching device 30-D may be a conventional tone relay which is made responsive thereto.

Between points A and B there is shown a tree T and a building structure S. It has been found that in areas having trees or other things protruding from the earth that relatively stronger signals are detected and with respect to building structures that the magnetic signaling field is easily detected therein, at least in buildings 2–3 stories in height.

Figure 2:
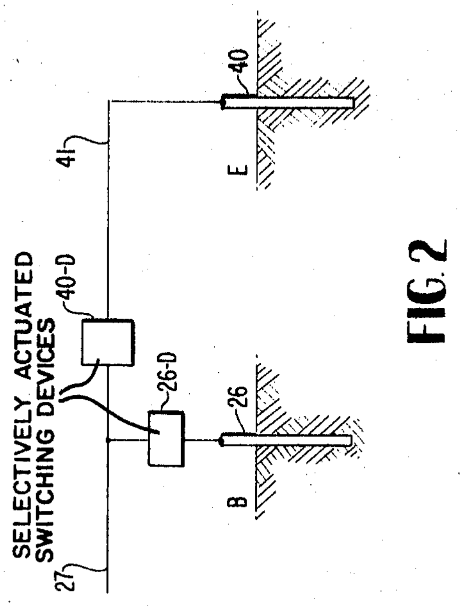

In FIG. 2 a simplified switching system is disclosed for selectively extending or changing the angular direction of the magnetic signaling field. In this arrangement a first switching device 26-D operated in accordance with coded signals from control unit 16, is connected between wire 27 and rod 26. At a further remote point E, conductor rod element 40 is driven in the earth, and connected by a single insulated wire 41 to switch device 40-D. Switch device 40-D is actuated by coded signals from control box 16 to connect wire 41 to wire 27, to thus apply the signal voltage to the earth between points E and A. It will be appreciated that switches 26-D and 40-D (as well as switch 30-D) are responsive to their own unique code signals from control unit 16 and may be selectively actuated, due regard being had for the impedance matching considerations described above.

Figure 3:
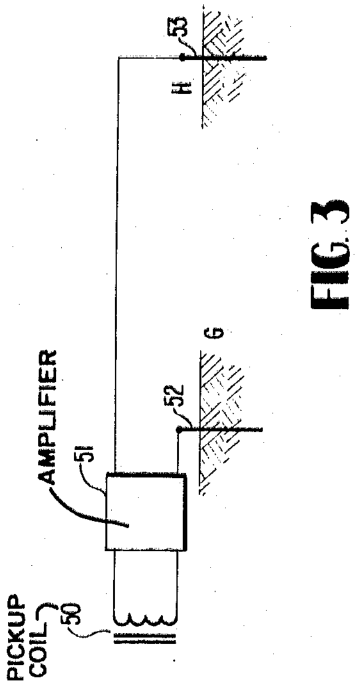

An alternative way of extending the area of communication coverage is disclosed in FIG. 3. In this arrangement, the magnetic induction signaling field is detected by a pickup coil 50, amplified by amplifier 51 and the amplified signal voltage applied to the earth between conductor rods 52 and 53 at spaced points G and H, respectively. This relay arrangement may be used to extend the range and/or area of coverage.

Figure 4:
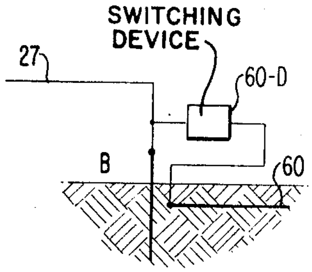
Figure 5:
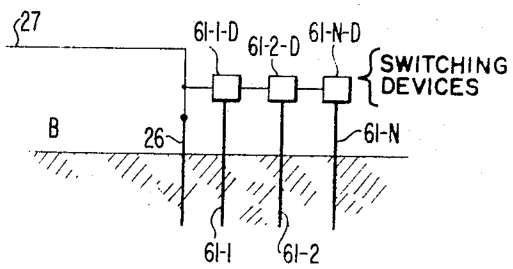

FIGS. 4 and 5 disclose an important feature of the invention, namely, the preferred methods of matching impedance at the remote points or conductor elements to achieve maximum utilization of the signal output of amplifier 10. As shown in FIGS. 4 and 5, the impedance at point B is lowered by embedding a further conductor rod or element 60 (FIG. 4) or elements 61-1, 61-2 . . . **61-*n* (FIG. 5) in the earth. In FIG. 4, a horizontal rod 60 (which is preferably a round stainless steel rod or wire) may be directly and permanently connected at one end to conductor rod 26. We have found such additional round rod or wire to be a very efficient means of lowering the impedance at point B so as to permit a more efficient coupling or transfer of signal voltage energy to the soil. Horizontal rod 60 may be selectively connected to rod 26 through switch device 60-D, which receives coded control signals from control unit 16 in the same manner as described earlier. As an alternative method of lowering the impedance at the remote points, vertical rods 61-1 . . . 61-N (spaced on about 12 inch centers) may be selectively connected by operation of coded relay switches devices 61-1-D 61-2-D . . . 61-N-D so that a number of closely spaced (12 inches) vertical rods may be controllably connected to rod 26. Preferably impedance lowering rods 60 and 61** extend at an angle of about 90° to a line extending between points A and B. It will be appreciated that if too many rods are used, the impedance may be lowered to such an extent that the mismatch of impedance precludes efficient transfer of energy and we have found that in the usual case about from one to about 8 5/8 inch stainless steel rods, each driven about 3 feet in the earth, provide sufficient flexibility to achieve an adequate match of impedance for efficient transfer of energy to the earth.

EXAMPLES

At a Golf Course in Houston, Tex., two 5/8 inch stainless steel rods were driven vertically to a depth of about 3 feet in the ground at points spaced a distance of about 3,500 feet apart. A 100 watt Bogen audio power amplifier was used as the signal source and the output signal ground terminal of the amplifier was connected to the near stainless steel rod using low resistance copper wire (No. 10 A.W.G.) Insulated number 10 (10 gauge A.W.G.) copper wire was used to connect the remote or for stainless steel rod to the other signal output terminal of the amplifier. The audio output voltage of the amplifier varied between 60 and 85 volts. Excellent coverage of an essentially somewhat elliptical 200 acres of ground area was achieved. This area was about 1,800 feet wide and about 4,600 feet in length, coverage extending about 700 feet beyond the remote stainless steel rod and about 400 feet beyond the near stainless steel rod. There was a short time lag (several seconds) between time of application of signal currents from the amplifier to creation of a useful magnetic induction signal field.

As another example, similar stainless steel rods were driven in a test field in New Jersey, a distance about 1,200 feet apart. The signal source was a commercial 100 watt audio power amplifier having an output voltage varying between about 60 and 85 volts and connected to the rods as described in the preceding example but using number 8 insulated wire. In this example an essentially elliptical signal area was formed above the earth's surface having a width of about 1,200 feet and a length of about 1,750 feet (500 feet beyond the remote stainless steel rod and there was about 250 feet beyond the near stainless steel rod), about a 2 second time lag between energization of conductors and appearance of the induction field.

As a further example, at a location in Medford, N. J. using two conductors approximately 1,200 feet apart connected by No. 10 wire, and with a Bogen model DC200A audio power amplifier, the area of useable signal readout above the ground inductively extended approximately 2,500 feet either side of the center-line between the two elements and 2,000 feet beyond the elements in line with the center-line.

RECEIVER CIRCUIT

Figure 6:
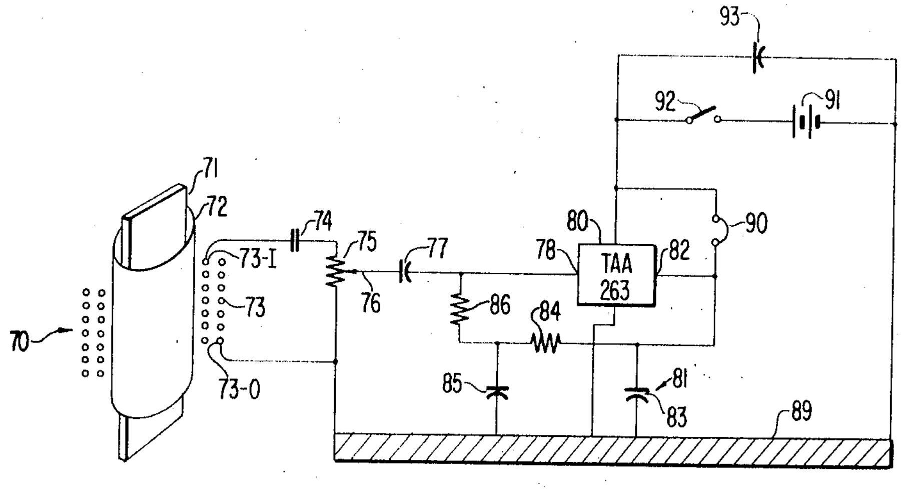
FIG. 6 illustrates a circuit diagram of a receiver or detection unit and utilization device for detecting magnetic induction signaling fields as produced by the systems shown in FIGS. 1–5.

As shown in Fig. 6, the receiver circuit comprises a pickup coil 70 having a high permeability laminated flat core 71 (which is described in greater detail hereinafter), from which induced signal currents are applied to an amplifier 80 (which, in the embodiment shown, is an integrated circuit model TAA 263 low level amplifier produced by Amperex Electronic Corporation and is a silicon monolithic integrated circuit amplifier having three stages of DC coupled amplification), a utilization device such as a headphone or earpiece 90, a power supply such as batteries 91 and an operating switch 92 to connect the battery to the circuit. Switch 92 may be of the type actuated closed on insertion of the earphone plug (not shown) into a jack. A feedback circuit 81 is also provided to eliminate noise signals as may be induced by power lines and the like which operate at 60Hz, or high frequency signals above the audio range.

The pickup coil 70 includes a cylindrical form 72 on which is wound multilayered coil 73 which, with the form of core 72 shown, may effectively include approximately 2,500 turns of 38 gauge wire. This coil form has an inside diameter of about ⅜ of an inch and the coil, after winding, has an outside diameter of about ⅝ of an inch; the end 73-O being at the outside winding layer and the end 73-I being at the innermost winding layer. The core material 71 is a single laminate 2 ⅛ inches long, about 25 mils thick and ⅜ inches wide of a high mu metal, as, for example, core material designated as high mu 80 laminate as produced and sold by the Magnetic Materials Company. In the embodiment shown the core has a width approximately the width of the inside diameter of the coil and a length which is somewhat greater than the axial length of the coil. It has been found that increasing the length of the core 71 to approximately 200 percent (or about 3 times) the length of the coil 73 provides an economical and highly efficient pickup coil-core structure for magnetic induction fields in the audio range; the response flattening out when the core length is increased above 200 percent. However, it is to be understood that other coil and core configurations have been effectively utilized, as for example, 6,000 turn coils having a different high permeability core material completely filling the core have been effectively utilized; and a 2,500 turn coil wound on the flat core achieve a smaller structure) has been used, the former being somewhat more expensive and the latter being somewhat less efficient.

Not shown in Fig. 3 is a low frequency filter which may be connected across the coil output terminals 73-I and 73-O to eliminate background noise signals as for example may be generated by high voltage power lines and other nearby devices. An additional filter (not shown) to eliminate high frequency noise and radio signals may also be connected to coil ends 73-I and 73-O. The signal currents induced in winding 73 are coupled through a coupling capacitor 74 (which is preferably connected to end 73-I for better response) to potentiometer 75 which has a wiper arm 76 connected to a second coupling capacitor 77 to apply signals to the input terminal 78 of integrated circuit amplifier 80. The battery voltage from battery 91 is applied to terminal 81 on integrated circuit amplifier 80 on closure of switch 91.

The signal output of integrated circuit amplifier 80 is taken from across output terminal 82 and power supply terminal 81 and in the embodiment illustrated is a high impedance or high resistance headphone or earphone 90 (which is preferably non-magnetic or relatively insensitive to magnetic fields). This provision thereby eliminates a source of signal distortion since the original signals are induced from a dynamic magnetic signal field and without further precaution, it is possible that when using magnetic induction type reproduction or utilization devices, as for example, a conventional loudspeaker having a voice coil therein to cause distortions so precautions should be taken so as to exclude the induction or inducing of signal voltages in such coils. A filter capacitor 93 is connected across battery and switch 92.

Negative feedback circuit 81 includes a shunt capacitor 83, resistor 84 and a further shunt capacitor 85, capacitors 83 and 85 along with resistor 84 forming a pi filter. The filtered feedback voltage appearing across capacitor 85 is applied through a dropping resistor 86 to input terminal 78 of integrated circuit amplifier 80. Capacitor 85 provides roll off of the negative feedback above about 200 Hz and capacitor 83 shunts out or by-passes to ground high frequency and noise signals.

Exemplary component values for the circuit of Fig. 3 are as follows:

| | |
|---|---|
| Capacitor **74** | .027 microfarad |
| Potentiometer **75** | 10 kΩ |
| Capacitor **77** | .01 microfarad |
| Integrated circuit amplifier **80** | Model TAA 263 (Amperex) |
| Capacitor **83** | .1 microfarad |
| Resistor **84** | 270 K ohm |
| Capacitor **85** | 10 microfarad |
| Resistor **86** | 5.6 K ohm |
| Capacitor **93** | 1.0 microfarad |
| Battery **91** | 2.8 Volt (two penlight mercury batteries) |
| Earphone **90** | 3,000 ohm (1.1k DC resistance |
| Coil **73** | 2,500 turns No. 38 wire on ⅜ inch cylindrical coil form |
| Core **71** | High Mu 80 laminate ⅜ inch wide .... 2 inch long ... Magnetic Material Company |

The above components were mounted on an etched printed circuit board in which a relatively large "land mass" or unetched metal was left on the board to serve as the ground or common of the circuit. In Fig. 6 the "land mass" is designated by the numeral 89, but it will be appreciated that this land mass may be irregularly shaped.

What is claimed is:

1. A communication method comprising, establishing a magnetic induction signaling field above and contiguous to and essentially within a selected geometrical pattern on the earth's surface comprising the steps of:

providing a pair of conductor points spaced apart a distance less than the length of the selected geometrical pattern and defining the shape thereof, one of said provided conductor points being constituted by alternating current electrical ground, and the other of said provided conductor points being constituted by at least one conductor element embedded in the earth in such manner that any conductive shunting of capacitive characteristics of the earth media between said points is kept to a minimum, providing a signal voltage source, connecting said signal voltage source to said conductor points to thereby impress on the earth between said one or more conductor elements a sustained dynamic electrostatic field, and electrostatically induce, along the equipotential lines of said electrostatic field, current flow and create a dynamic magnetic induction signal field which extends above the earth's surface and which is confined essentially within said selected geometrical area, and, inductively detecting said magnetic induction signaling field at a plurality of locations in said geometrical area.

2. The invention defined in claim 1 wherein said at least one conductor element is a straight rod of non-corrosive metal and said method including the step of lowering the system's impedance at the embedded conductor element which is remote from said signal voltage source to enhance the capacitive current flow by inserting at least one additional conductor element in the earth.

3. The invention defined in claim 1 wherein including the step of embedding said at least one conductor element so that it is vertically embedded in the earth.

4. The invention defined in claim 2 wherein the step of lowering the impedance includes placing in the earth a horizontal conductor element adjacent to said at least one conductor element and connecting one end of said horizontal conductor element to an end of said at least one conductor element.

5. The invention defined in claim 2 wherein said at least one further conductor element is connected to said at least one conductor element by an electrical switch and including the step of selectively actuating said switch to selectively vary the size of said magnetic induction signaling field.

6. The invention defined in claim 1 wherein there are at least one further of said conductor points, including a further conductor element embedded essentially vertically in the earth, said one of said conductor points constituted by alternating current electrical ground being located at a first point adjacent to said signal voltage source, a second of said conductor points being located at a second point remote from said signal voltage source, and said further of said conductor points being located at a third point remote from said first and said second points, and said first conductor point being connected to a first output terminal of said signal voltage source, and low resistance conductor wire and switch means connecting said second and said third straight conductor points to the other output terminal, said method including the step of changing the shape of said geometrical pattern by operating said switch means to selectively apply said signal voltage to said second and/or said third straight conductor points.

7. The invention defined in claim 6 wherein said third conductor point is nearer to said first point than is said second point and located laterally of an imaginary line between said first point and said second point, and wherein the conductor wire-switch means connecting said third point to said other terminal has an effective resistance greater than the resistance between said other terminal and said second conductor element whereby sustained dynamic electrostatic fields are created in the earth between said first point and said second point and said first point and said third point to establish a pair of respectively symmetrical magnetic induction signal areas above the earth's surface.

8. The invention defined in claim 7 including the step of adjusting the system's total impedance at each of said remote points, respectively, by placing a further conductor element in the earth adjacent said remote points, respectively, and connecting one end thereof to an end of the conductor elements at said remote points, respectively.

9. A method of transmitting communication signals to points within a limited geographic land area comprising the steps of:

selecting at least a pair of spaced points within said limited geographical land area and defining one of said selected points being constituted by alternating current electrical ground, and the other of said points being constituted by at least one conductor element embedded in the earth in such manner that any conductive shunting of capacitive characteristics of the earth media between said points is kept to a minimum, impressing a signal voltage between said two spaced points and the large dielectric earth mass therebetween to impress an electrostatic signal field within said dielectric earth mass to thereby induce a large, homogenous magnetic signal field within and extending above the earth's surface and for substantial lateral distances to each side of imaginary lines between said points, and within said limited geographical area, said land area being determined by the placement of said points on the earth's surface, detecting by magnetic induction, changes in said magnetic signal field within said limited geographical land area to produce an electrical signal, and supplying said electrical signal to a utilization device.

10. The invention defined in claim 9 including extending the area of communication comprising, detecting the signal at a point within the area of communication established by impressing said signal voltage on said spaced points, amplifying the detected signal to produce a further signal voltage, impressing said further signal voltage on a further pair of spaced earth embedded conductor elements, detecting the resulting magnetic induction signaling field to produce a detected signal voltage, and applying said detected signal voltage to a utilization device.

11. The method of causing a thing protruding from the earth, such as a tree, building structure, or other thing having a portion embedded in the earth, to serve as a magnetic communication element comprising, embedding a pair of spaced conductor elements in the earth at each side of the thing, so that at least a portion of the thing is in the dielectric earth media between said spaced conductor elements and in the electrostatic field defined hereafter, said conductor elements being placed in the earth at each side of said thing, respectively, in such manner that any conductive shunting of capacitive characteristics of the earth media therebetween is kept to a minimum, and, applying a signal voltage to said pair of conductor elements to create a sustained dynamic electrostatic field in the earth between said conductor elements and at least the portion of said thing which is in the earth and said electrostatic field between said conductor elements.

12. The method of magnetic signaling within a building structure on and extending above the earth's surface comprising the steps of vertically embedding at least one conductor element in the earth adjacent said building structure, said conductor element being placed in the earth in such manner that any conductive shunting of capacitive characteristics of the earth media and alternating current electrical ground is kept to a minimum, applying a signal voltage between said conductor element and alternating current electrical ground and electrostatically induce a flow of current in the earth at least along equipotential lines of said electrostatic field and create a dynamic magnetic induction field within and above the surface of the earth and extending within said building, inductively detecting said magnetic signaling field to produce an electrical signal, and applying said electrical signal to a utilization device.

13. A system for producing a dynamic magnetic signaling field above the earth's surface and within a selected limited area thereof comprising, a source of electrical signal voltage having a pair of output terminals, a remote conductor member embedded into the earth and at a point remote from said signal voltage source, a near conductor member connected to the earth electrical ground at a point adjacent to said signal voltage source, said remote conductor member being embedded in the earth in such manner that any conductive shunting of capacitive characteristics of the earth media between said remote conductor member and said earth electrical ground is kept to a minimum, a conductor wire connecting said remote conductor member to one of said output terminals, and means connecting said near conductor member and said earth electrical ground to the other output terminal, whereby the earth between said conductor members is electrostatically energized by electrical signals from said signal voltage source and establishes a magnetic signaling field above and contiguous to the surface of the earth.

14. The invention defined in claim 13 including impedance reducing means at said remote conductor member for lowering the impedance as seen by said signal source, said impedance reducing means comprising at least one further conductor member buried in the earth and electrically connected to enhance the capacitive current flow in the earth therebetween.

15. The invention defined in claim 13 wherein said conductor connecting said remote conductor member to said source consists of a single wire.

16. The invention defined in claim 13 including at least one further remote conductor member, said at least one further remote conductor member being at a remote point nearer to said source than the first said remote conductor member, and a further conductor wire having an effective impedance higher than the impedance of the first said conductor wire and connected at one end to said first conductor member and intermediate said first conductor member and said source and connected at the other end to said further remote conductor member.

17. Apparatus for exciting the earth to establish a dynamic magnetic signaling field in the air over a selected geographical land area of the earth comprising, at least a pair of spaced conductor rods of substantially noncorrosive conductor material, said conductor rods being spaced a large distance apart and embedded in the earth to a distance of at least 2 feet, means connecting one of said conductor rods to alternating current electrical ground the other of said conductor rods being adopted to be placed in the earth in such manner that any conductive shunting of capacitive characteristics of the earth media between said rods is kept to a minimum, a signal voltage source adjacent to one of said conductor rods and having a pair of output terminals, low resistance conductor means connecting one of said output terminals to the earth embedded conductor rod adjacent thereto, and a low resistance wire conductor having an insulation thereon connecting the other of said output terminals to the other of said conductor rods, thereby an electrostatic field is impressed on the earth media to electrostatically induce displacement current flow and create a large homogenous magnetic signalling field.

18. The invention defined in claim 17 wherein said conductor rods are vertical and including at said other of said conductor rod means for lowering the impedance and enhancing capacitive current flow at said other conductor rod as seen at the end of said insulated low resistance wire conductor end connected to said other conductor rod.

19. The invention defined in claim 18 wherein said means for lowering the impedance comprises at least one further conductor rod imbedded in the earth and connected at one end to an end of said other conductor rod.

20. The invention defined in claim 19 wherein said other vertical rod is of stainless steel and embedded in the earth for a distance of between 2 and 6 feet and wherein said horizontal conductor rod is at an angle of about 90 degrees to a line between said pair of spaced vertical conductor rods.

21. The invention defined in claim 20 wherein said horizontal conductor rod is between from about 3 to 9 feet in length and is buried in the earth at a depth of from about 6 to 12 inches.

22. The invention defined in claim 17 including means for extending the area of said magnetic signaling field, comprising wireless apparatus responsive to the signal between said spaced conductor rods for producing a signal voltage corresponding to the signal voltage from said signal voltage source, at least a further pair of spaced conductor rods embedded in the earth at points remote from said first named conductor rods, and means for connecting the signal voltage produced by said wireless apparatus to said at least further pair of spaced conductor rods.

* * * * *